(No Model.) 3 Sheets—Sheet 2.
J. P. BROWN.
FENCE MACHINE.
No. 360,401. Patented Mar. 29, 1887.
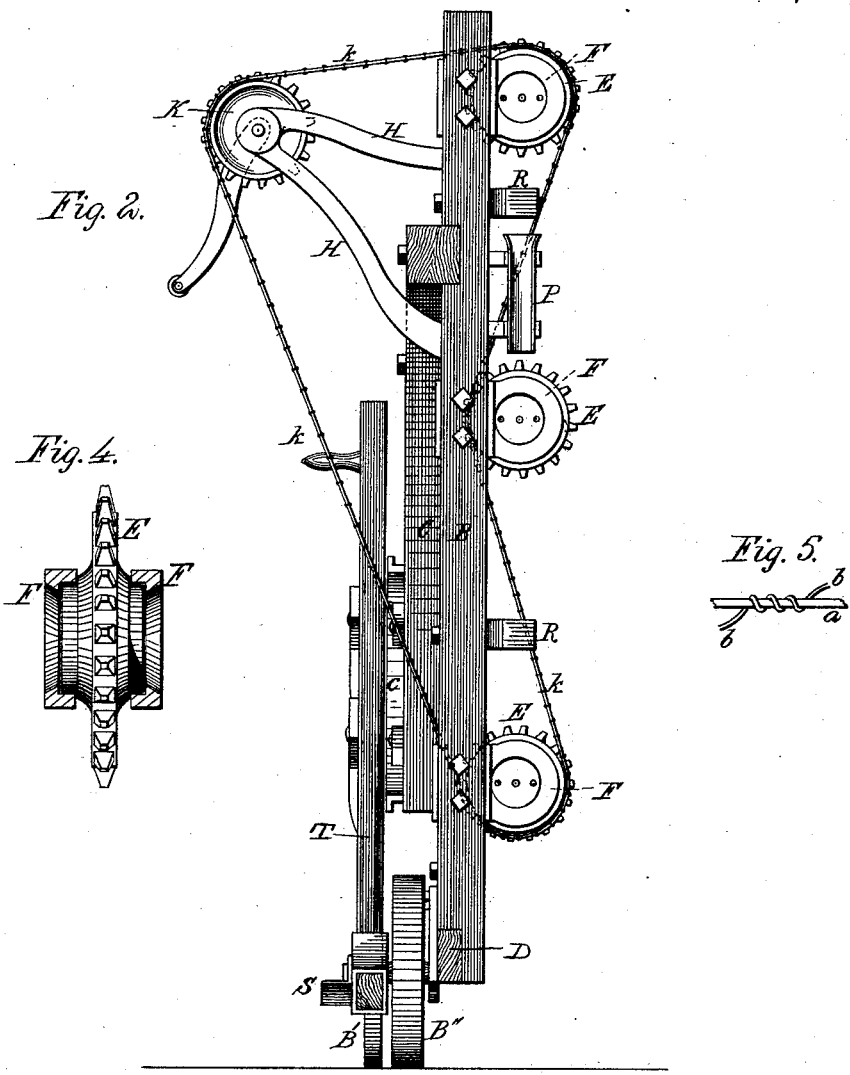
Witnesses:
W. C. Jirdinston.
E. W. Reeton
Inventor:
John P. Brown
by Stem & Peck
his Attorneys.

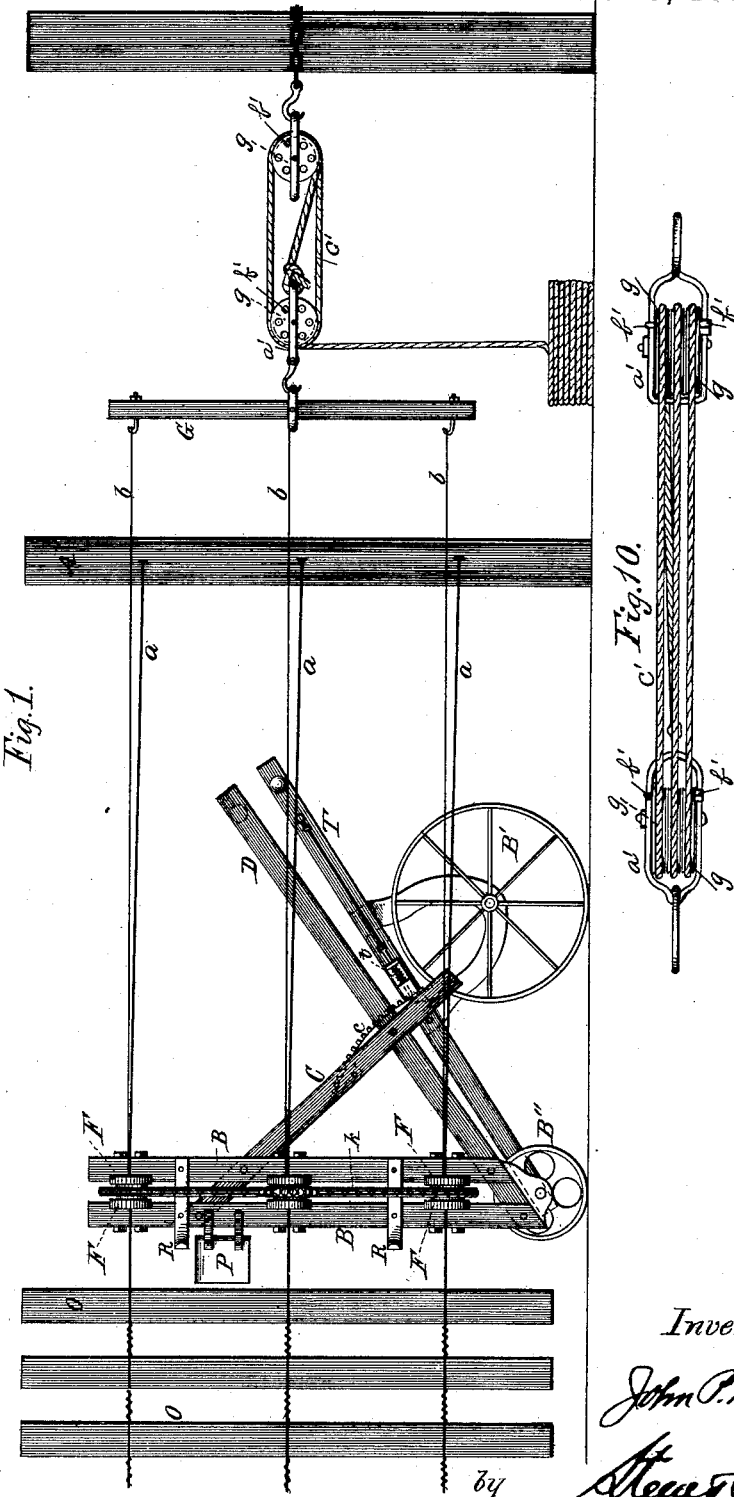

(No Model.) 3 Sheets—Sheet 3.
J. P. BROWN.
FENCE MACHINE.
No. 360,401. Patented Mar. 29, 1887.
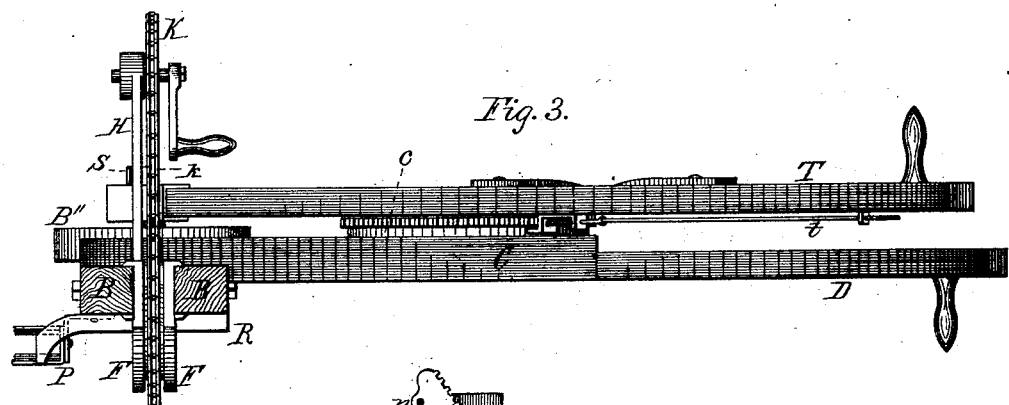
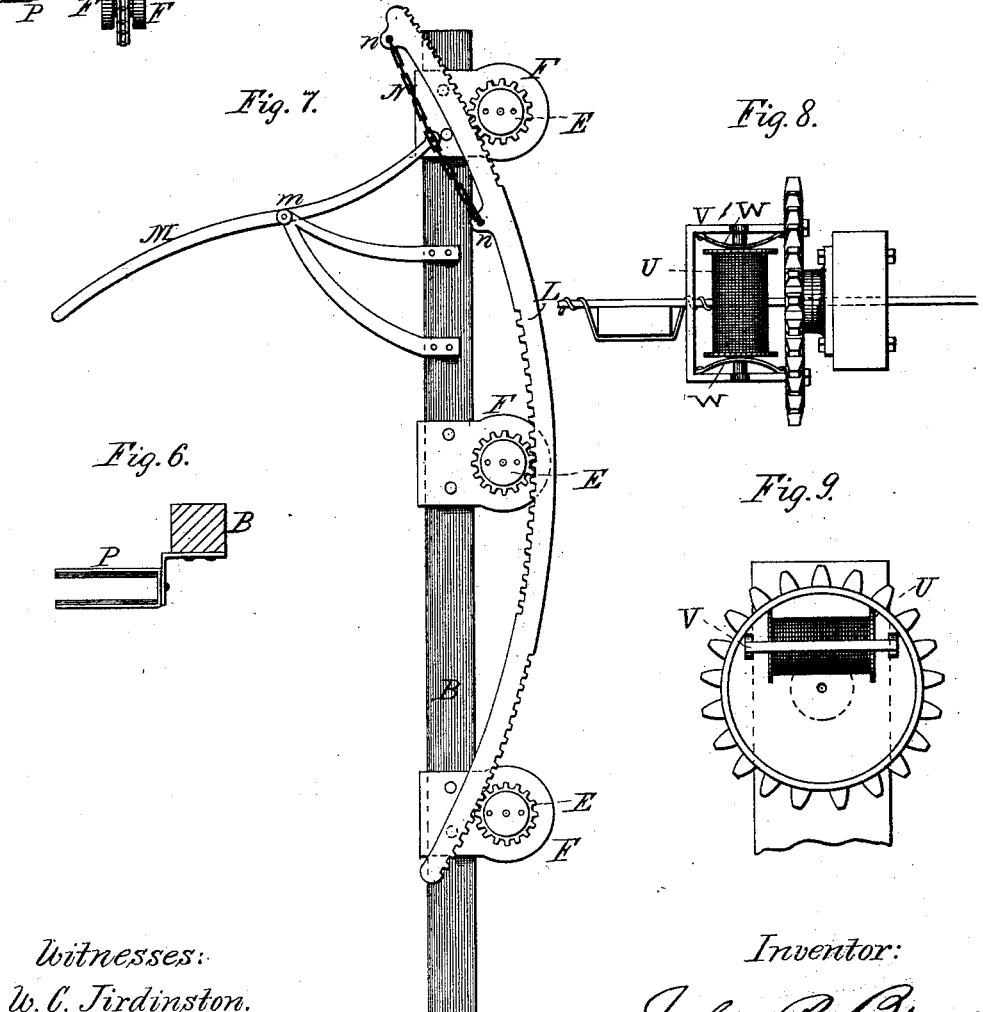
Witnesses:
W. C. Jirdinston.
E. W. Rector
Inventor:
John P. Brown,
by Stem Peck
his Attorneys.

United States Patent Office.

JOHN P. BROWN, OF RISING SUN, INDIANA, ASSIGNOR, BY DIRECT AND MESNE ASSIGNMENTS, TO MARY E. BROWN, OF SAME PLACE.

FENCE-MACHINE.

SPECIFICATION forming part of Letters Patent No. 360,401, dated March 29, 1887.

Application filed January 21, 1886. Serial No. 189,280. (No model.)

*To all whom it may concern:*

Be it known that I, JOHN P. BROWN, a citizen of the United States, residing at Rising Sun, in the county of Ohio and State of Indiana, have invented certain new and useful Improvements in Fence-Machines, of which the following is a full, clear, and exact description, reference being had to the accompanying drawings, forming part of this specification.

My invention relates to an improvement in that class of fence-machines for making wire and picket fences which are denominated "portable" fence-machines, and which permanently construct the fence upon the ground and in the position it is to occupy.

It has for its object the simplification of the construction of this class of machines, and its novelty will be herein set forth, and specifically pointed out in the claims.

In the accompanying drawings, Figure 1 is a side elevation of a fence-machine embodying my invention. Fig. 2 is an end elevation of the same. Fig. 3 is a top plan view of the same. Fig. 4 is a side view, partly in section, of one of the sprocket-wheels and guide-twisters, together with the bearings of the same. Fig. 5 is a detail representing one form of twist. Fig. 6 is a plan view of one of the picket-guides. Fig. 7 represents a modification of the guide-twister-operating mechanism. Fig. 8 is a plan view representing in detail a modification of the guide-twisters. Fig. 9 is a front elevation of Fig. 8. Fig. 10 is a plan view of the sheaves constituting the tension mechanism.

The same letters of reference are used to indicate identical parts in all the figures.

As seen in Fig. 1, my machine is composed, essentially, of what I designate as two "frames," the one composed of two upright bars, B B, properly braced together, and containing between them the twister-heads, to be presently described, a rearwardly and upwardly extending bar, D, rigidly secured to the bars B at their lower ends, and a cross-brace, C, rigidly secured at its upper end to the bars B, near their tops, and at its lower end to the bar D. This frame-work, composed of the bars B, C, and D, is mounted, by means of metallic boxing or other suitable means, upon a wheel, B'', arranged directly under the bars B and journaled in said boxing.

What I designate as the second frame is a bar, T, pivoted at its lower end to the axle of the wheel B'', or to a stud upon the boxing in line with said axle. This bar T is provided on its under side with a hanger-bracket carrying a spindle, upon which is journaled a wheel, B', which is preferably larger than the wheel B''.

Rigidly secured to the brace C is a segmental rack, c, formed on a segment of a circle of which the axis of the wheel B'' is the center.

Upon the side of the bar T, in proper bearings, is a spring locking-dog, t, adapted to engage with the rack c, to hold the two frames locked together in any of their adjusted positions. A cord or wire extending to the upper end of the bar T may be employed for operating the bolt or dog t.

For convenience of operation, the upper ends of the bars D and T are provided on opposite sides with laterally-extending handles, as seen in Fig. 3.

It results from this construction that I have two frames adjustable with respect to each other, and by which I am enabled on hilly ground to always maintain the bars B B in a perfectly upright or vertical position. As the wheels B' B'' both rest and travel upon the ground, it would be proper to say that either the bar T, with its wheel B', constituting one frame, is raised toward or lowered from the bars B B of the main frame, or that the bars B B are lowered toward or raised from the bar T, for both the frames are pivoted upon a common axis, and are held locked together in any of their adjusted positions by the dog t and rack c.

The guide twister-heads are perforated sprocket-wheels E, which have hubs on each side confined in ring-brackets F, secured to the sides of the bars B. There may be as many of these twister-heads as it is desired to have sets of wires for uniting the pickets.

Under one form of my invention, as seen in Fig. 2, a drive-chain, k, is passed around the sprocket-wheels E in such manner as to cause the same to revolve in the same direction. This drive-chain is also passed over a main driving sprocket-wheel, K, journaled in a bracket, H, secured to the bars B B, and whose shaft is provided with an operating-crank. By turning this crank the twister-heads are simultaneously revolved in the same direction to effect the twisting of the wires.

Under another form of my invention, as seen in Fig. 7, a curved rack, L, engages with pinions upon the twister-heads. This rack is so constructed and applied, as shown, to the twister-heads as to cause them to revolve simultaneously and in the same direction when the rack is operated. To operate this rack I provide a lever, M, which, pivoted at $m$ to a bracket extending from the bars B B, has its inner end secured to a chain, N, whose ends are fastened to lugs $n$ upon the rack L. By operating the lever M the rack L is vibrated in the line of its circle, and the leverage is so arranged that one complete stroke, either down or up, of the lever M is sufficient to make the necessary twists between two pickets, and its reverse stroke makes the necessary twists between the succeeding two pickets in a reverse direction, as will be readily understood.

As a means for uniting the bars B B, I employ cross-bars R, which, projecting and properly curved out at the front of the machine, as seen in Fig. 3, constitute buffers for forcing the picket, when inserted, tightly between the wires up against the preceding twist, and by ramming the machine forward this action of the buffers is accomplished.

To insert each picket properly and expeditiously, a picket-guide, P, as shown in Figs. 1, 3, and 6, is secured to the forward bar B in line with and between the buffers R.

Where it is desired to have a larger main wire, around which a smaller wire is to be twisted to attach the pickets, each of the twister-heads is provided with a central perforation for the passage of each of said main wires, which wires are not twisted, but occupy a straight line entirely on one side of the row of pickets. The smaller wires to be twisted around said main wires for the attachment of the pickets are passed each through a perforation in the twister-head at one side of the central perforation, in such manner that the revolution of the twister-heads effects the twisting of the small wires around the main wires, as seen in Fig. 5. As a modification of this means of twisting, which would permit a continuous twist in one direction, the smaller wires may each be carried on bobbins U, supported on journals in a frame, V, attached to the front side of each twister-head, so as not to interfere with the straight passage of the central main wire.

Any suitable tension or friction device, such as springs W, may be applied to the bobbins, to prevent the too rapid unwinding of the wire and to afford the necessary resistance to effect a close twist. In the former case, where the bobbins are dispensed with, the main wires $a$ are stretched between and secured to the starting-post and to posts in the line of the fence, one of which posts, A, is shown. The smaller wires, $b$, are secured to the starting-post, (not shown,) extend back through the perforations in the twister-heads, and have their rear ends connected to a vertical equalizer-bar, G, preferably by means of swiveled hooks, and said equalizer-bar is hitched, by means of two sheave frames, or blocks which carry perforated sheaves $g$, and a rope, hereinafter described, to a post in the line of the fence.

It is evident that the larger main wire may be dispensed with, in which event two wires of equal size would be inserted through perforations in each twister-head, one on each side of its center, in which event all of the wires are hitched to the equalizer-bar G.

As seen in Fig. 10, each of the sheave-frames $a'$ contains three sheaves, which sheaves, as seen in Fig. 1, are perforated to receive locking-pins $b'$, which pass through all the sheaves in each set, and, coming in contact with the frame, serve to lock all of the sheaves. To connect the sheaves I employ a tension-rope, $c'$, which, fastened at one end to the block of one of the sets of sheaves, is passed successively around the sheaves, and its opposite end may hang down free, or be formed into a coil, as shown.

The sheaves and the rope $c'$ form the preferable tension device of my machine, and their operation is as follows: The pins being removed from the sheaves, leaving them free to turn, the rope is fastened to the block of one of the sets of sheaves and passed successively around the sheaves, as shown and as above described. The operator by then pulling on the free end of the rope draws the two sets of sheaves nearer together, and, through the medium of the equalizer G, takes up all the slack in the wires. When the wires have been thus drawn to the desired tension, the pins $b'$ are inserted in the perforations in each set of sheaves to prevent their turning. The free end of the rope, which must usually be of considerable length, is then left loose or coiled upon the ground. While the sheaves are now locked from turning, it will be seen that the rope is yet free to slip over them when sufficient force is applied to the set of sheaves nearest the machine, but that in so slipping it has to overcome the friction created by its passage around the sheaves. As each picket is twisted in, the wires are thereby taken up, the increased strain is communicated through the equalizer G to the set of sheaves nearest said equalizer, and the rope is caused to slip over the sheaves sufficiently to slacken the wires to the extent necessary to relieve the increased strain caused by the twisting-in of the picket. The rope $c'$ is preferably of a size to fit the grooves in the sheaves and give a large friction-surface, and the friction of the rope on the sheaves can be increased by passing the rope more times around the sheaves, or diminished by passing it around less times or leaving it off of some of the sheaves entirely. In this manner any desired degree of tension may be applied to the wires, and when the tension has been adjusted it remains the same during the entire operation of the machine, the rope slipping over the sheaves as each picket is twisted in.

It will be understood that the wires, after having been secured to the starting-post and passed through the machine, are usually stretched all the way across the field, or to the termination of the line of the proposed fence, and that the equalizer G is attached to the wires at this end at some considerable distance from the machine—sometimes a hundred yards or more—the wires on uneven ground being held apart and off the ground on their passage across the field in any suitable manner—as by passing them through staples secured to the fence-posts at intervals in the line of the proposed fence. Again, it is evident that the equalizer-bar G might be dispensed with and all the wires, or either set of them, be directly secured to the sheave block next to the machine.

To enable the operator to hold the machine more securely up to its work during the operation of twisting, and to further aid him in ramming forward the pickets, I provide a laterally-projecting stirrup, S, upon which one of his feet can be placed, thus enabling him to use foot-power as well as hand-power in doing this work.

Having thus fully described my invention, I claim—

1. A portable fence-machine consisting of an upright frame carrying a series of connected and simultaneously-rotating twister-heads, said frame being supported on a wheel resting directly upon the ground, and a second frame pivoted to the upright frame and carrying a wheel resting upon the ground, and adjustable locking mechanism for uniting the two frames in different positions, whereby the said two frames can be adjusted relatively to each other for the purpose of maintaining that part of the upright frame which carries the twister-heads in a constant vertical position, substantially as described.

2. In a portable fence-machine, the series of twister-heads E E for twisting the wires, journaled in brackets in the upright frame, in combination with the segmental rack L, substantially as and for the purpose described.

3. In a portable fence-machine, the uprights B B, carrying the twister-heads E E and picket-guide P, said uprights forming part of an upright frame mounted upon a wheel, B″, in combination with the arm T, carrying a supporting-wheel, B′, said arm being pivoted to the upright frame, and means for adjustably locking said arm T to the upright frame, substantially as and for the purpose described.

4. In a portable fence-machine, the combination, with the upright frame and a second frame hinged together, mounted upon wheels, and provided with means for locking the upright frame in a vertical position, of the cross-bars R, secured to and uniting the upright bars B B, the forward curved ends of said cross-bars projecting beyond the front of the machine in line with the pickets, to serve as buffers, substantially as described.

5. The perforated sheaves $g\,g$, each set journaled in a frame, the one frame secured at one end to a fixed post, and the other having the wires connected with it at its opposite end, in combination with the tension-rope passed around said sheaves and connected to one of said frames, and locking-pins inserted through the perforations in the sheaves, substantially as and for the purpose described.

6. The combination, with the perforated sheaves $g\,g$, each set journaled in a frame, the one frame secured at one end to a fixed post, and the equalizer-bar G, connected to the opposite end of the other of said frames and having the wires attached to it, of the tension-rope passed around said sheaves and connected to one of said frames, and locking-pins inserted through the perforations in the sheaves, substantially as and for the purpose described.

JOHN P. BROWN.

Witnesses:
E. W. RECTOR,
OTTO RICHTER.